Aug. 22, 1944. D. J. KING 2,356,165
FINISHING TOOL
Filed Oct. 29, 1942
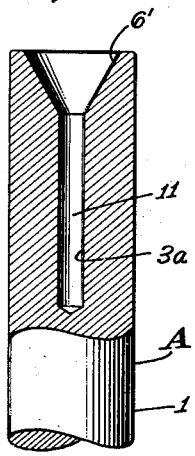
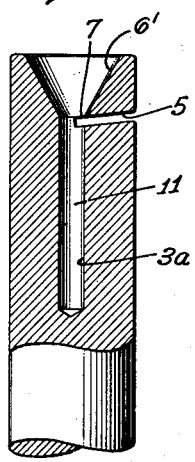
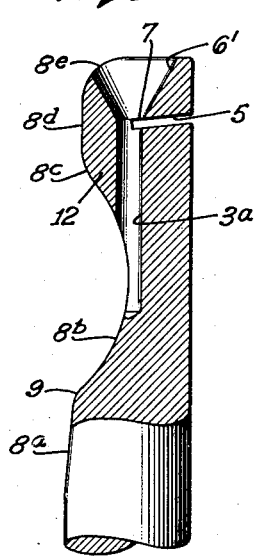
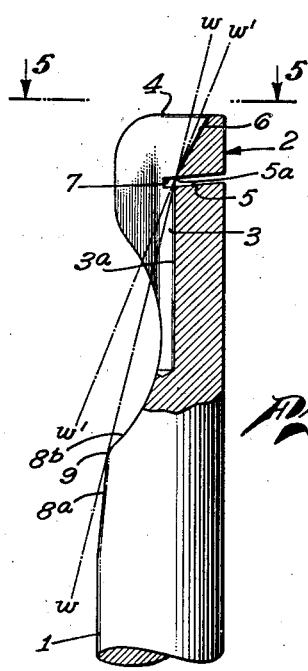
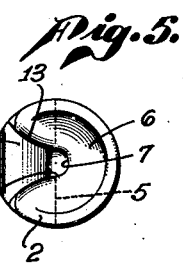
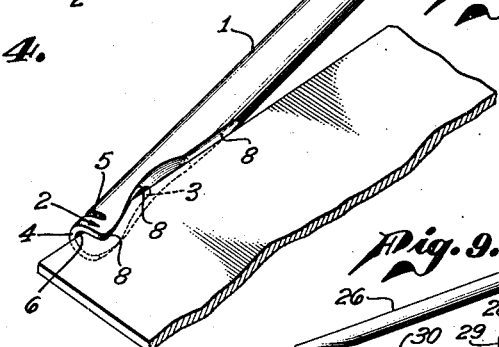
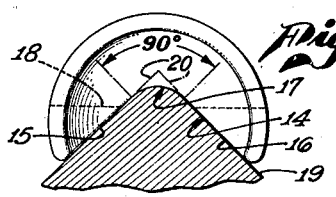
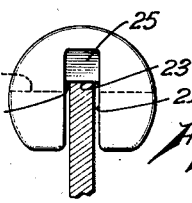
DELBERT J. KING, INVENTOR
ATTORNEY Patented Aug. 22, 1944

2,356,165

UNITED STATES PATENT OFFICE 2,356,165

FINISHING TOOL

Delbert J. King, Los Angeles, Calif.

Application October 29, 1942, Serial No. 463,843

5 Claims. (Cl. 90—24)

This invention relates to finishing tools, and pertains more particularly to a device which may be employed to shape the edge portion of a piece of metal, sheet plastic, or the like, as in the removal of burrs from a punched or sheared sheet, or the shaping of the corner portions of a piece of metal as in die-making.

The device of the present invention is particularly adapted for use as a burring tool, i. e., a tool for removing "burrs" from sheet material and the like. In the aircraft manufacturing industry, particularly in connection with the use of aluminum alloy sheet material, it has been found essential to remove the burrs caused by punching or shearing operations, before the part may be used in the aircraft. This removal has heretofore been accomplished by filing and then finishing with emery paper or the like to remove the file marks, as any sharp indentation in the surface of the metal is conducive to the development of fatigue failure. Any tool which produces a sharply serrated finished edge, or produces any sharp indentations, is not acceptable. In this connection, one of the particular objects of the invention is to provide a device of the character described which is so shaped as to be capable of removing the burrs from the edge portions of sheet metal or the like and leave a smooth finished surface free of objectionable sharp indentations or serrations.

A further object of the invention is to provide a finishing tool of unitary construction, provided with a cutting edge formed integrally with the body of the tool. A further object of the invention is to provide an elongated finishing tool having along one longitudinal edge a longitudinally extending material-receiving guide slot within which the edge of the material to be worked upon is disposed, and a cutting edge extending transversely across the base of such guide slot and defined by the cross-sectional shape of the base wall of such slot, such cutting edge being further defined by a transverse slot extending from the opposite edge of said tool toward and into intersection with said longitudinal slot.

The above and other objects and features of the invention will be brought out more fully in the ensuing description of certain embodiments of the invention, as illustrated in the accompanying drawing, in which:

Figs. 1 to 4 illustrate certain progressive stages in the formation of a finishing tool according to the present invention, as shown in partly broken-away longitudinal section;

Fig. 5 is an end elevation of the completed tool, as taken on line 5—5 in Fig. 4;

Fig. 6 is a perspective view of the completed tool, showing the manner of use thereof in a burring operation on a piece of sheet stock.

Figs. 7 and 8 are end elevational views of the cutting head end of two forms of modified finishing tools according to this invention, showing in transverse section the shape in connection with which they are respectively adapted to be used; and Fig. 9 is a side view, on reduced scale, of a tool of this invention provided with an auxiliary handle portion, which may be adapted to any of the disclosed forms of the device.

Referring particularly to Figs. 4 and 5 of the drawing, the finishing tool of this invention may comprise an elongated shank portion 1 of circular, square, hexagonal, or other desired cross-section, at one end of which a cutting head 2 is provided. The cutting head is defined by a pair of transversely intersecting slots in the body portion of the shank 1, namely, a longitudinal slot 3 through the side of the tool and extending from the forward end 4 of the cutting head rearward for any desired distance (for example, from about one and one-half to two and one-half shank-diameters, for most uses), and a transverse slot 5 through the opposite side of the tool extending into intersection with the slot 3. The slot 5 is spaced from the forward end a short distance, and may be defined as being located "adjacent" such end (in the sense of "near" but not "at"). The slot 3 is shown to be widened and increased in depth, as at 6, forward of the slot 5, and the cutting edge of the tool is formed at the forward edge 5a of the slot 5, at the intersection thereof with the slot 3, as at 7.

Referring particularly to Fig. 4, it will be observed that the side of the shank at which the slot 3 opens has been cut away as at 8, providing a shoulder 9 which is preferably of such height and so spaced from the forward end 4, in relation to the position of the cutting edge 7, that a line connecting the shoulder 9 and the edge 7 (indicated at w—w) will make an angle in the neighborhood of 15° with the length of the tool, and the increase in depth of the slot 3 forward of the edge 7 is preferably such as to make an angle in the neighborhood of 15° with such line. The tool is held in such position with respect to the edge of the work (see Fig. 6) that such edge will make an angle of between 15° and 30° with the length of the tool (as along the line w'—w' in Fig. 4, for example) as a cut is made. As shown in Fig. 6, the rearward or handle end 10 of the tool may be grasped between the thumb, index and second fingers of the hand, as shown in dot-dash lines, and pulled towards the user. It will be apparent that the handle portion may be bent to a convenient angle, if desired, to allow an alternative grip on the device.

In Figs. 1 through 5 I have illustrated a preferred method of producing a finishing tool of this invention from a rod of suitable stock (such as drill-rod, or the like). Where specific dimensions are recited, it will be appreciated that they are intended to be illustrative only, inasmuch as the dimensions of the guide slot, cutting edge, and diameter of the tool, will be subject to variation dependent upon the service which it is intended that the tool shall render.

Referring to these figures, the rod-shaped blank A, of round or other desired cross-sectional shape, $\frac{5}{16}$ inch in diameter, for example, is drilled at one end with a $\frac{3}{32}$ inch axial hole, as at 11 to form the base wall 3a of the longitudinal slot 3. The widening and deepening of the slot 3 which is desired at a position forward of the transverse slot 5, as at 6, is conveniently secured by drilling a taper 6' coaxially with the hole 11. The taper 6' and the hole 11 may be formed in the same operation by use of a center drill. The taper 6' is preferably of approximately 60°.

The second operation to be performed on the blank is that of forming the transverse slot 5. This slot is milled into one side of the blank, as shown in Fig. 2, preferably to a depth such as to intersect the centerline of the hole 11, as indicated by the dotted line 5 in Fig. 5. This slot is formed in such position that the forward edge 5a thereof intersects the juncture of the taper 6' with the hole 11 at the centerline of the hole 11, and the resulting intersection which defines the cutting edge 7 will be of arcuate shape. If the slot 5 is formed normal to the centerline of the hole 11, the cutting edge 7 will be truly semi-circular; I prefer, however, to cause the slot 5 to be inclined forward and outward, at an angle of from 5° to 15° to the normal, in order to provide a cutting angle in the neighborhood of 60° at the centerline of the cutting edge 7, when the work is held at the normal angle to the length of the tool (as indicated by the line w'—w' in Fig. 4), which causes a nominal departure from truly circular shape at the cutting edge 7.

After the slot 5 has been formed, I preferably mill away the side of the blank opposite the side at which the slot 5 was formed, somewhat as shown in Fig. 3, to form the shoulder 9 as at 8a and 8b (the curve 8b being caused preferably to intersect the centerline of the hole 11), and to round off the forward end of the tool as at 8c, 8d and 8e. This shaping is conveniently accomplished by means of a profile cutter.

The slot 3 is then completed by milling away the material left at 12 (Fig. 3) by passing a cutter longitudinally from the intersection of the curve 8b with the hole 11, shaping the slot 3 outward and transversely into a form such as shown in end elevation in Fig. 5. The widening of the slot 3 transversely as at 13 allows the user of the tool to cant it to some extent when in use.

The tool particularly illustrated in Figs. 1–6 is adapted primarily for the removal of burrs from stamped sheet stock, such as sheet metal, moulded plastic, and the like.

The finishing tool of this invention is useful also upon work other than sheet stock. For example, I have in Fig. 7 illustrated the end view of a modified form of tool adapted to form a radius on a 90° corner of a block of material, as is frequently required in die-making. Referring to this figure, the longitudinal slot 14 (corresponding to the slot 3) is formed with its opposing side walls 15 and 16 at 90° to one another, and the arcuate base wall portion 17 being curved through an angle of 90°. The transverse slot 18, shown by the dotted line, is formed after the manner of the slot 5, and is extended past the base wall portion 17. The block of material 19, originally of the shape shown by the projected side-wall lines 20, is first engaged by the bottom of the base wall 17 of the slot 14, and when the apex at 20 is cut away into the desired shape the side walls 15 and 16 of the slot 14 will engage the side walls of the work 19. It will be appreciated that where a salient angle of less or more than 90° is to be worked upon, the angle between the side walls 15 and 16 will be established accordingly.

In Fig. 8 I have illustrated a finishing tool adapted to produce a flat edge upon a sheet of material. In this form the longitudinal slot 21 (corresponding to the slot 3) is provided with a flat base wall portion 22, and the desired cutting edge 23 is provided by intersecting the slot 21 with a transverse slot 24 corresponding to the slot 5 above. The slot 21 is deepened as at 25 forward of the cutting edge 23, to provide a suitable clearance angle. It will be appreciated that the base wall of the slot 21 may be inclined with respect to the side walls of the slot, so that the tool may be employed to chamfer the edge of a piece of sheet stock to a desired angle.

In Fig. 9 I have shown a finishing tool of this invention provided with a combined auxiliary handle and spacing member adapted to engage the work in cooperation with the cutting head of the tool, whereby the tool is maintained at a constant working angle and at the same time the worker's fingers are guarded from inadvertent contact with the edge of the sheet stock. Referring to this figure, the tool is shown at 26, provided with an auxiliary handle portion 27 of wood, plastic, or the like, secured thereto as at 27', said portion 27 being provided with a re-entrant curved portion 28 at its forward edge adapted for engagement by the second finger of the user (see Fig. 6), and a base portion 29 provided with a longitudinal slot 29' in longitudinal alinement with the longitudinal slot of the cutting head and adapted to slidably engage the edge of the sheet stock 30 which is being worked upon.

Other modifications and adaptations of the tool of this invention, and the method of making the same, will occur to those skilled in the art, and I choose therefore not to be limited to the specific forms herein delineated and described, but rather to the scope of the subjoined claims.

I claim:

1. A finishing tool comprising an elongated shank provided with a cutting head portion at its forward end and a handle portion at its rearward end, said cutting head portion being provided with a longitudinal guide slot extending from said forward end and opening at one side of said shank, and a transverse slot adjacent said forward end, said transverse slot being extended from the opposite side of said shank toward and into intersection with said longitudinal slot to define a cutting edge at its forward side, and said longitudinal slot being of increased depth from said cutting edge to the forward end of said shank.

2. A finishing tool as set forth in claim 1, said longitudinal slot being provided with a base wall of concave cross-sectional configuration, wherefore the cutting edge formed at such intersection is of arcuate shape, and said longitudinal slot being increased in width as well as depth from said cutting edge to the forward end of said shank.

3. A finishing tool comprising an elongated shank provided with a cutting head portion at its forward end and a handle portion at its rearward end, said cutting head portion being provided with a cutting edge extending transversely to the length of said shank portion and defined by two intersecting slots, one of said slots extending longitudinally from said one end towards the other end and the other of said slots extending transversely of said shank adjacent said one end, the respective slots being extended inward from opposite longitudinal sides of said shank, said shank being provided with shoulder means spaced rearward from said cutting edge and at the side of said shank through which said longitudinal slot extends at a position such that a line joining said cutting edge and said shoulder makes an angle in the neighborhood of 15° with the length of said shank, and said longitudinal slot being of increased depth from said cutting edge to the forward end of said shank so as to define an angle in the neighborhood of 30° with respect to the length of said shank.

4. A finishing tool as set forth in claim 3, said longitudinal slot being provided with a base wall of concave cross-sectional configuration, wherefore the cutting edge formed at such intersection is of arcuate shape, and said longitudinal slot being increased in width as well as depth from said cutting edge to the forward end of said shank.

5. A finishing tool as set forth in claim 3, and comprising in addition, an auxiliary handle portion secured to the rearward end of said shank at the side thereof corresponding to the position of said longitudinal slot, said auxiliary handle portion being provided with a longitudinal guide slot longitudinally alined with said longitudinal slot and positioned to define an angle of less than 15° but not more than 30° between the length of said shank and a line joining said cutting edge with said guide slot.

DELBERT J. KING.